US008244893B2

(12) United States Patent
Branigan et al.

(10) Patent No.: US 8,244,893 B2
(45) Date of Patent: *Aug. 14, 2012

(54) COMPUTER PROGRAM PRODUCT FOR DYNAMICALLY OPTIMIZED HANDLING OF MESSAGES RECEIVED FROM A MESSAGE TRANSMISSION BACKBONE BY A DATA PROCESSING SYSTEM NODE

(75) Inventors: James Peter Branigan, Apex, NC (US); David Kenneth Lavin, Cary, NC (US); Eric Stephen Yokeley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

This patent is subject to a terminal disclaimer.

(21) Appl. No.: 12/130,564

(22) Filed: May 30, 2008

(65) Prior Publication Data
US 2008/0229328 A1 Sep. 18, 2008

Related U.S. Application Data

(63) Continuation of application No. 10/755,824, filed on Jan. 12, 2004, now Pat. No. 7,467,216.

(51) Int. Cl.
*G06F 15/16* (2006.01)
(52) U.S. Cl. ........................... 709/230; 709/206
(58) Field of Classification Search .................. 709/206, 709/230
See application file for complete search history.

(56) References Cited

U.S. PATENT DOCUMENTS

| 6,363,422 | B1 * | 3/2002 | Hunter et al. ................ 709/224 |
| 6,865,167 | B2 * | 3/2005 | Famolari et al. ............. 370/331 |
| 6,925,482 | B2 * | 8/2005 | Gopal et al. ................. 709/201 |
| 7,467,216 | B2 | 12/2008 | Branigan |
| 7,765,262 | B2 * | 7/2010 | Gross et al. ................. 709/206 |

OTHER PUBLICATIONS

US Patent No. 7,467,216, "Method, System and Computer Program Product for Dynamically Optimized Handling of Messages Received From a Message Transmission Backbone by a Data Processing System Node," Notice of Allowance dated Aug. 8, 2008.

* cited by examiner

*Primary Examiner* — Minh-Chau Nguyen
(74) *Attorney, Agent, or Firm* — Yudell Isidore Ng Russell PLLC

(57) ABSTRACT

A method, system, and computer program product for handling messages on a message transmission backbone within a distributed data processing system is disclosed. A filter module generates an allowable message types data structure, and stores the allowable message types data structure in a memory. Each entry of the allowable message types data structure includes information for identifying an allowable message type on the basis of one or more message characteristics. A change in a status of a module within a group of loaded programs, which includes multiple data processing software modules, is detected. In response to detecting the change in the status of a module within the group of loaded programs, a corresponding entry within the allowable message types data structure is modified. Then, when messages arrive from the message transmission backbone, a filtering module communicates a message to the group of loaded programs if an item of identifying information within the message meets a criterion of the entries within the allowable message types data structure.

23 Claims, 4 Drawing Sheets

COMPUTER PROGRAM PRODUCT FOR DYNAMICALLY OPTIMIZED HANDLING OF MESSAGES RECEIVED FROM A MESSAGE TRANSMISSION BACKBONE BY A DATA PROCESSING SYSTEM NODE

The present application is a continuation of U.S. patent application Ser. No. 10/755,824, filed on Jan. 12, 2004, entitled "Computer Program Product for Dynamically Optimized Handling of Messages Received from a Message Transmission Backbone by a Data Processing System Node". Applicants claim benefit of priority under 35 U.S.C. §120 to U.S. patent application Ser. No. 10/755,824, which is incorporated by reference herein in its entirety and for all purposes.

BACKGROUND OF THE INVENTION

1. Technical Field

The present invention relates in general to message handling in a distributed data processing system environment and in particular to filtering messages received from a message transmission backbone. Still more particularly, the present invention relates to a system, method and computer program product for dynamically optimizing the filtering of messages received from a message transmission backbone by a data processing system node.

2. Description of the Related Art

The advent of distributed data processing systems, which typically consist of a series of processing nodes connected by a message transmission backbone, has facilitated the creation of a seemingly infinite variety of distributed processing environments. These environments range from general-purpose data processing systems, which leverage the flexibility of a distributed architecture to create ever-faster execution of complex computations, to specialized systems for the control of complex machines. In either case, the independent nodes communicate with one another by broadcasting messages from one node to its peers across a message transmission backbone, such as a messaging bus. Currently available message transmission backbones range from conventional metal-conductor implementations in general-purpose systems to fiber-optic implementations in advanced vehicular systems and wireless implementations in communications systems.

One problem in optimizing the use of system resources in distributed data processing systems relates to the sheer volume of inter-nodal message traffic. In current technological implementations, nodes connected to the message transmission backbone process a tremendous number of messages, many of which prove to be irrelevant to the functions of the receiving node. The present invention recognizes that, to conserve nodal processing resources and/or to reduce nodal computational requirements, a system for configurably filtering messages received by a data processing system node from a message transmission backbone is needed.

SUMMARY OF THE INVENTION

A method, system, and computer program product for handling messages on a message transmission backbone within a distributed data processing system is disclosed. A filter module generates an allowable message types data structure, and stores the allowable message types data structure in a memory. Each entry of the allowable message types data structure includes information for identifying an allowable message type on the basis of one or more message characteristics. A change in a status of a module within a group of loaded programs, which includes multiple data processing software modules, is detected. In response to detecting the change in the status of a module within the group of loaded programs, a corresponding entry within the allowable message types data structure is modified. Then, when messages arrive from the message transmission backbone, a filtering module communicates a message to the group of loaded programs if an item of identifying information within the message meets a criterion of the entries within the allowable message types data structure.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
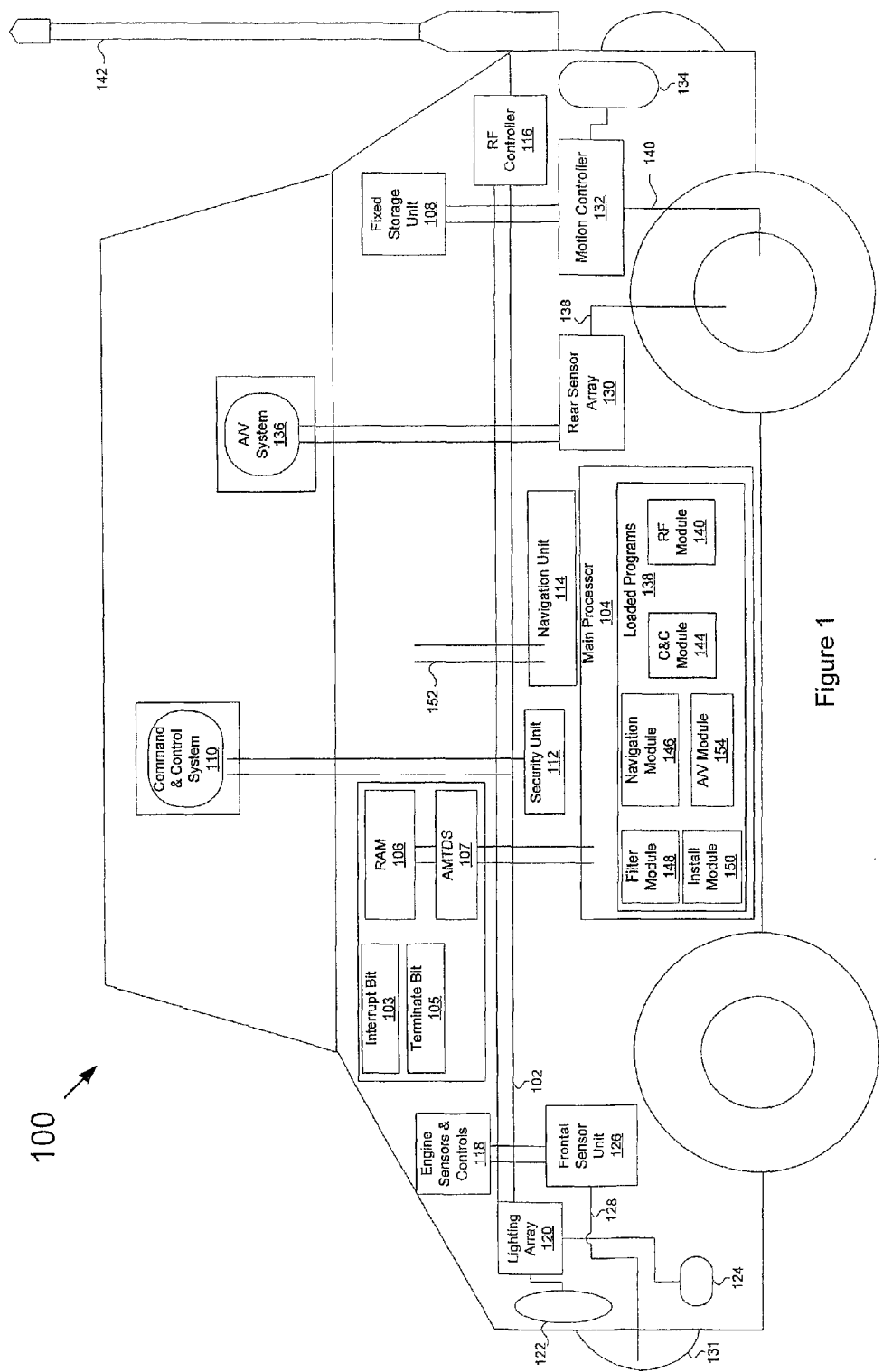
FIG. 1 illustrates a distributed data processing system in a vehicular environment, in which a preferred embodiment of the present invention is implemented.

With reference now to the figures and in particular with reference to FIG. 1, a distributed data processing system in a vehicular environment, in which a preferred embodiment of the present invention is implemented, is illustrated. FIG. 1 depicts a vehicle 100, which contains a distributed data processing system, the components of which are linked to a message transmission backbone 102. In the embodiment illustrated in FIG. 1, a single messaging backbone is depicted, but alternative embodiments of the present invention may employ multiple message transmission backbones.

While the preferred embodiment, as depicted in FIG. 1, is illustrated with respect to a wheeled vehicle, those skilled in the art will quickly realize that the present invention may be implemented in a variety of other platforms including both vehicles of other types and stationary implementations. Other vehicular implementations may include aircraft or watercraft. Stationary embodiments may include distributed home computing and appliance control systems or other stationary distributed computing systems.

The distributed data processing system illustrated in FIG. 1 contains a main processor 104 for performing data processing functions. Although message processing in accordance with the present invention is described herein with respect to main processor 104, such message processing may alternatively be performed on any of a variety of special purpose processors or other components interacting with message transmission backbone 102. Additional components linked to message transmission backbone 102 include a random access memory (RAM) 106 for storing items of data or instructions for use by main processor 104. For example, RAM 106 provides storage for a terminate bit 103, an allowable message type data structure (AMTDS) 107 and an interrupt bit 105.

A fixed storage unit 108 is also linked to message transmission backbone 102. Fixed storage unit 108 serves as a long-term storage unit for items of data and program instructions used by various components of distributed data processing system 101. Additionally, components linked to message transmission backbone 102, which serve to control functions of vehicle 100, include a command and control system 110 for facilitating communication of information to and commands from the user of vehicle 100.

A security unit 112 is also provided for performing security functions, which include theft deterrence and emergency signaling over RF antenna 142. A navigation unit 114 interacts with a radar frequency (RF) controller 116 to provide location and navigation data through command and control system 110 to the user of vehicle 100. The data processing system further includes engine sensors and controls 118, which control the propulsion systems of the vehicle, a lighting array 120, which provides road illumination and signaling through a primary light unit 122, and a signaling unit 124. A frontal sensor unit 126 monitors the performance of the vehicle through a frontal sensor unit 128 in a bumper 131. A rear sensor array 130 monitors engine and transmission performance through a rear sensor 138, while a motion controller 132 controls use of brake signals 134 and, through an actuator 140, controls braking functions and transmission functions. An audiovisual (A/V) system 136 provides display, music and entertainment functions to users of vehicle 100.

As will be apparent to one skilled in the distributed data processing system arts, A/V system 136, security unit 112, navigation unit 114 and command and control system 110, are special-purpose processing nodes, with processing and storage capabilities that are potentially profoundly distinct from those of main processor 104 and each other. In a preferred embodiment as illustrated in FIG. 1, each of A/V system 136, security unit 112, navigation unit 114 and command and control system 110, may implement customized versions of an allowable message types data structure and filter module to suit their application requirements and processing and storage capabilities. These customized implementations will be tailored to the functions and the need to protect processing bandwidth on each node. The present invention, though illustrated with respect to a preferred embodiment involving heterogeneous nodes, can also be implemented within a system of homogeneous processing nodes connected by a message transmission backbone.

Main processor 104 may execute code within a group of programs shown as loaded programs 138. These loaded programs 138 include an RF module 140 for controlling operations of RF controller 116 and RF antenna 142, which provide data to A/V system 136 and A/V module 154, command and control system 110, though optional, it seems to help here and navigation unit 114. A command and control (C&C) module 144 provides instructions to various vehicular systems including motion controller 132, engine sensors and controls 118, lighting array 120, security unit 112 and navigation unit 114. A navigation module 146 provides navigation computation functions.

A filter module 148 provides a method for handling messages on a message transmission backbone within data processing system 101. An install module 150 provides the installation, activation and removal of other modules among loaded programs 138 on main processor 104. Finally, message transmission backbone 102 includes an expansion unit 152 supporting connection to message transmission backbone 102 of new units of hardware to provide functionality not currently provided, or providing an interface with message transmission backbone 102 for loading of new software modules.

Figure 2:
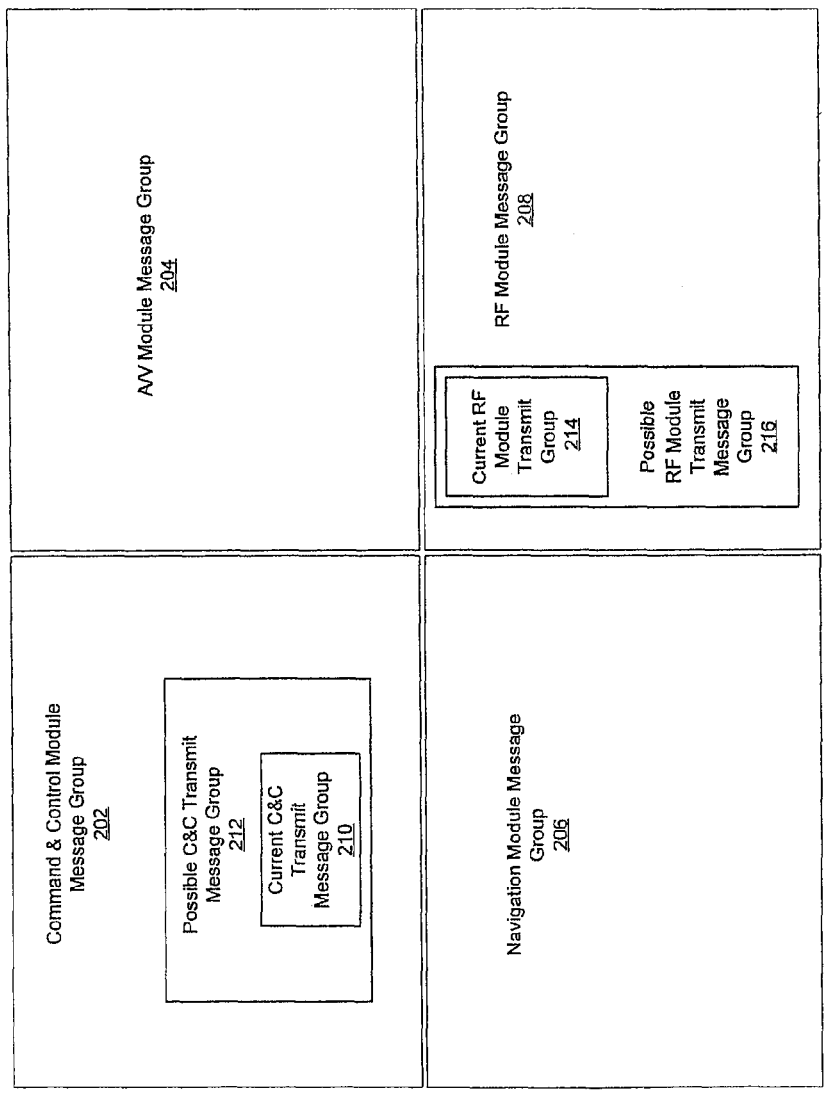
FIG. 2 depicts a message handling methodology in accordance with a preferred embodiment of the present invention.

Referring now to FIG. 2, a diagram depicting a message handling methodology in accordance with a preferred embodiment of the present invention is presented. FIG. 2 shows an exemplary traffic grouping 200, which is a set of possible message groups that may exist on message transmission backbone 102. Command and control module message group 202 represents a group of messages on message transmission backbone 102, which are directed to C&C module 144; A/V module message group 204 represents a group of messages on message transmission backbone 102, which are directed to A/V module 154; navigation module message group 206 represents a group of messages on message transmission backbone 102, which are directed to navigation module 146; and RF module message group 208 represents a group of messages on message transmission backbone 102, which are directed to RF module 140.

Among the messages in command and control message group 202, current C&C message group 210 represents messages supported by the current configuration of C&C module 144. Possible C&C message group 212 represents messages not currently supported by C&C module 144, but which C&C module 144 may support at a later configuration. Likewise, among RF module message group 208, current RF module message group 214 represents messages supported by the current configuration of RF module 140. Possible RF module message group 216 represents messages not currently supported by the configuration of RF module 140, but which may possibly be supported by a future configuration of RF module 140.

For purposes of explaining the operation of the preferred embodiment of the present invention, assume that message transmission backbone 102 carries messages represented by exemplary traffic grouping 200, and that A/V system 136 and navigation unit 114 are not engaged. Therefore, A/V module 154 and navigation module 146 will not need to process messages. Filter module 148 will be configured to discard messages from message transmission backbone 102, which are addressed to A/V module 154 and navigation module 146, and to prevent those messages from being communicated to loaded programs 138. Additionally, assume that the current configuration of C&C module 144 supports and requires current C&C message group 210 and that RF module 140 supports and requires current RF module message group 214.

The present invention recognizes that, to conserve nodal processing resources and/or to reduce nodal computational requirements, a system for configurably filtering messages received by a data processing system node from a message transmission backbone is needed. To conserve nodal processing resources and/or to reduce nodal computational requirements, with respect to exemplary traffic grouping 200, filter unit 148 will preferably communicate current C&C message group 210 and current RF module message group 214 to loaded programs 138. To do this, filter module 148 dynamically modifies AMTDS 107 to support identification of messages from current RF module message group 214 and current C&C message group 210. Filter module 148 will thereafter discard messages from command and control module message group 202 other than current C&C message group 210. Filter module 148 will also discard messages from RF module message group 208 other than RF module message group 214, as well as excluding messages from A/V module message group 204 and navigation module message group 206.

The process for filtering these messages in a preferred embodiment of the present invention is explained with respect to FIG. 3C below. In addition to the method of filtering discussed with respect to FIG. 3C, a pre-filter may be used in conjunction with the process of FIG. 3C to improve the efficiency of filter module 148 by prohibiting a message from being transmitted on message transmission backbone 102 based on whether an item of identifying information within said message meets a criterion of the pre-filter. Use of an additional pre-filter reduces the volume of messages processed by filter module 148 under the process illustrated in FIG. 3C. In addition to the method of filtering discussed with respect to FIG. 3C, a tiered filtering system may also be used, where a tier of static filtering is employed to improve the efficiency of filter module 148 by constantly discarding an identified class of messages based on whether an item of identifying information within said message meets a criterion of the static filter tier. A static filter tier may be used as a part of filter module 148 or with a separate static filter module.

If a loaded program 138 changes the set of messages that are of interest, then the filter implemented by filter module 148 can change to accommodate the new set of messages of interest. Once the filter implemented by filter module 148 has been modified, loaded program 138 will receive only those messages which pass the new filter. For example, if A/V module 154 becomes engaged, then the preferred embodiment of the present invention permits filter module 148 to reconfigure AMTDS 107 to allow for identification and communication of all or a portion of A/V module message group 204 to loaded programs 138. Likewise, if the configuration of C&C system 110 changes and it becomes necessary for filter module 148 to communicate messages from possible C&C message group 212 to C&C module 144, the preferred embodiment of the present invention permits filter module 148 to reconfigure AMTDS 107 to allow for identification and communication of possible C&C message group 212 to loaded programs 138. The process for reconfiguration of AMTDS 107 to allow for identification of a message type supported by a new configuration of the distributed data processing system is explained below with respect to FIG. 3B.

Figure 3:
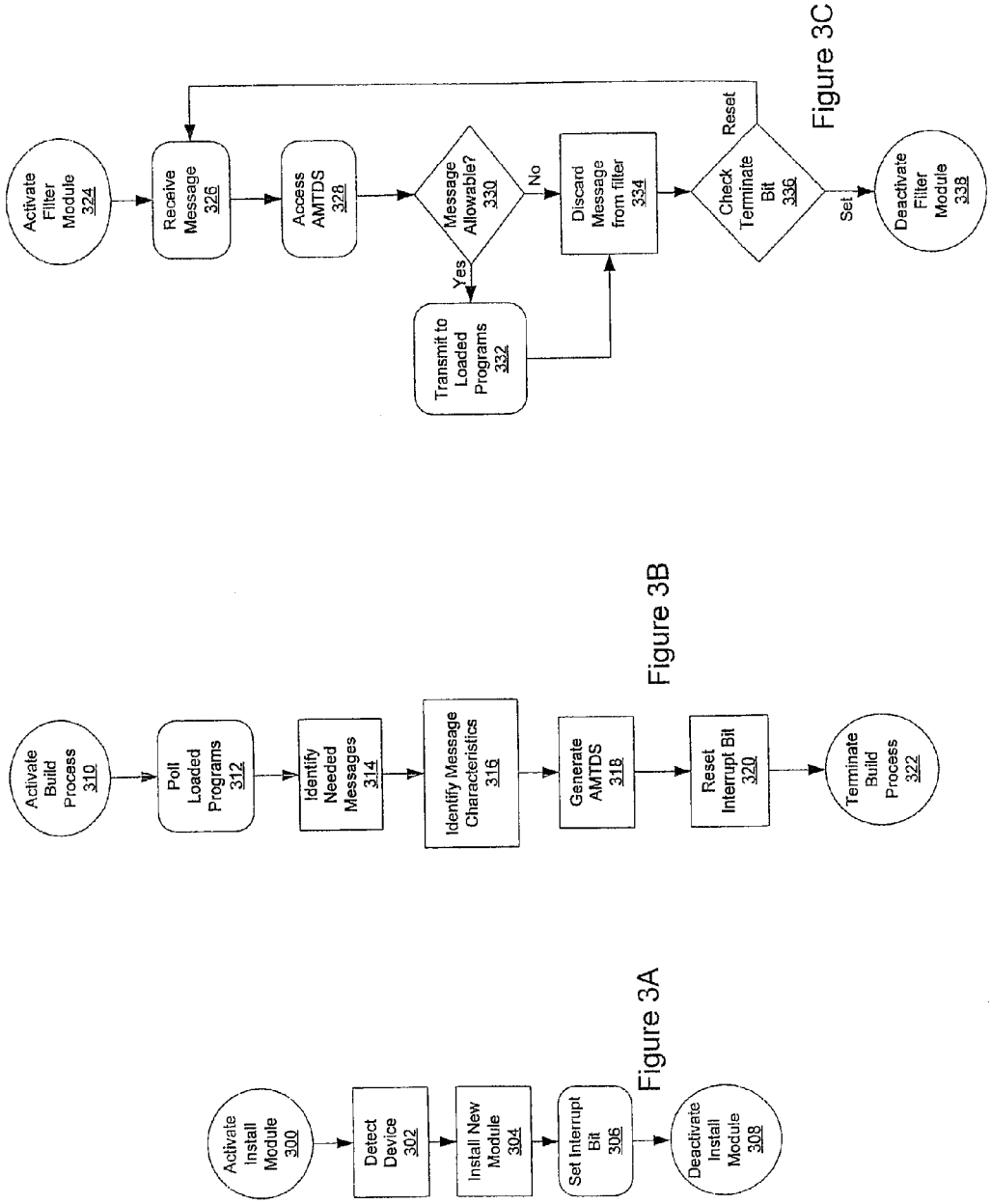
FIG. 3A is a high-level logical flowchart of a process for installing program modules in a distributed data processing system.
FIG. 3B depicts a high-level logical flowchart of a method for dynamically building a selectively configurable filter to handle messages on a message transmission backbone within a data processing system.
FIG. 3C is a high-level logical flowchart of a filter process for handling messages on a message transmission backbone within a distributed data processing system.

With reference now to FIG. 3A, there is depicted a high-level logical flowchart of a process for installing program modules in a distributed data processing system. The process begins at step 300, which depicts activation of an install module 150 as depicted in FIG. 1. In one preferred embodiment of the present invention, install module 150 detects new items of hardware or software that have been installed and adds modules to loaded programs 138 on main processor 104. The process then proceeds to step 302, which illustrates install module 150 detecting a new device installed in the distributed data processing system. The process next moves to step 304, which depicts install module 150 installing a new module to interact with the detected device and adding the module to loaded programs 138 on main processor 104. The process then proceeds to step 306, which depicts install module 150 setting interrupt bit 103 in RAM 106. The process next proceeds to step 308, which depicts deactivation of install module 150.

With reference now to FIG. 3B, a high-level flowchart of a method for dynamically building a selectively configurable filter to handle messages on a message transmission backbone within a data processing system is illustrated. The process begins at step 310, which depicts the filter module 148 activating a build process illustrated at blocks 312-322. The process next moves to step 312, which depicts filter module 148 polling loaded programs 138 to determine what modules are installed on main processor 104. The process next moves to step 314, which illustrates filter module 148 identifying messages, which filter module 148 will communicate from message transmission backbone 102 to loaded programs 138 on main processor 104. For example, in exemplary traffic grouping 200 of FIG. 2, filter module 148 will identify current C&C message group 210 and current RF module message group 214 for communication to loaded programs 138.

The process then proceeds to step 316, which illustrates specifying characteristics of messages identified in step 314. Messages transmitted via message transmission backbone 102 are typically formatted into several fields of varying lengths with varying sets of valid values. Filter module 148 specifies characteristics of message types such as particular values in a type field or other delimited field that will enable identification by filter module 148.

The process then moves to step 318, which depicts filter module 148 dynamically generating AMTDS 107. AMTDS 107 is an index of identifying information consistent with the allowable message types for filter module 148. Filter module 148 compares each incoming message on message transmission backbone 102 to AMTDS 107, looking for a characteristic in a delimited field of the message that is consistent with one of the field types listed in AMTDS 107. The process then moves to step 320, which depicts resetting interrupt bit 103 in RAM 106. The filter building process thereafter terminates at step 322.

Referring now to FIG. 3C, a high-level logical flowchart of a filter process for handling messages on a message transmission backbone within a distributed data processing system 101 is presented. The process begins at step 324, which depicts activating a filter module 148. The process then proceeds to step 326, which depicts filter module 148 receiving a message from message transmission backbone 102. The process then moves to step 328, which depicts filter module 148 accessing the dynamically generated AMTDS 107 within RAM 106. The process next proceeds to step 330, which depicts filter module 148 comparing the received message to AMTDS 107 and determining if the message is allowable. If the message is not allowable, then filter module 148 discards the message at step 334. If the message is allowable, the process next proceeds to step 332, which depicts filter module 148 communicating the message to at least one other module among loaded programs 138 for further handling and processing. After the received message is communicated in step 332, the process proceeds to step 334, which illustrates filter module 148 discarding the message.

The process next proceeds to step 336, which depicts filter module 148 determining if there are any additional messages to be processed by checking a terminate bit 105 in RAM 106. If terminate bit 105 is reset, then filter module 148 accepts another message from message transmission backbone 102 at step 326. If the terminate bit is set, then the filter module is deactivated at step 338 until another message is received.

Figure 4:
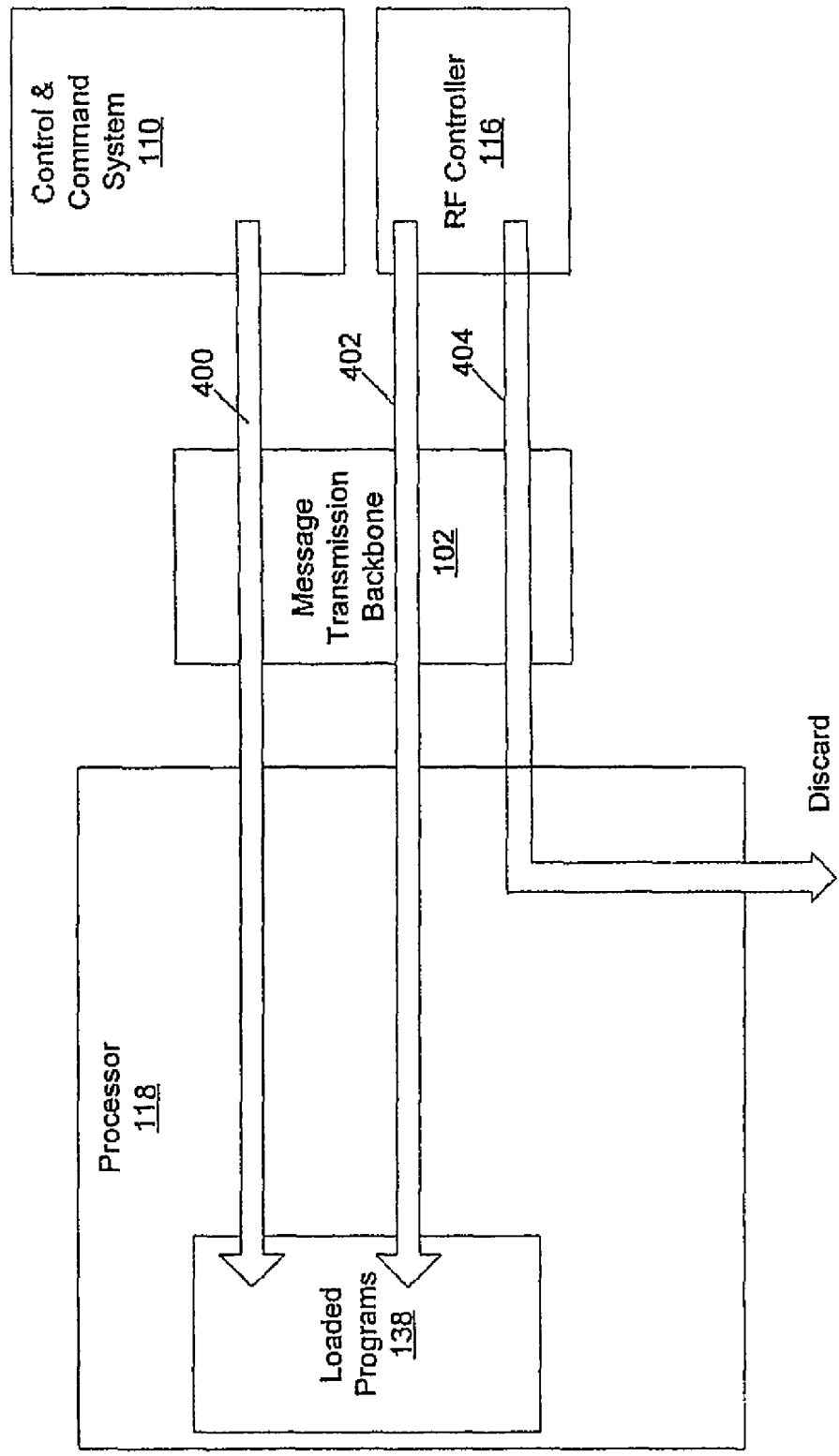
FIG. 4 depicts a distributed data processing system performing a filtering process for handling messages on a message transmission backbone within a distributed data processing system.

Referring now to FIG. 4, a distributed data processing system performing a filtering process for handling messages on a message transmission backbone is depicted. FIG. 4 shows command and control system 110 sending a first message 400 across message transmission backbone 102. Because first message 400 is from the set of current C&C message group 210, filter module 148 communicates first message 400 to one or more other loaded programs 138. FIG. 4 also shows RF controller 116 sending a second message 402 across message transmission backbone 102 to RF module 140. Because second message 402 is from the set of current RF module message group 214, filter module 148 communicates first message 400 to one or more other loaded programs 138. RF controller 116 also communicates a third message 404 across message transmission backbone 102 directed to navigation module 146, which is disengaged. Because navigation module 146 is disengaged, AMTDS 107 does not contain a corresponding entry, which would allow filter module 148 to communicate third message 400 to one or more other loaded programs 138. Consequently, the third message 404 is not communicated by filter module 148 to any other loaded program 138 and is discarded.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, tangible storage media such as floppy disks or CD ROMs.

What is claimed is:

1. A method for handling messages within a data processing system, said method comprising:
   the data processing system generating a message types data structure for filtering messages communicated between a message source within the data processing system and a message destination within the data processing system, wherein the message types data structure indicates at least one allowable message type that can be communicated with one or more program modules within a group of program modules in the data processing system;
   the data processing system repetitively monitoring for a change in a status of a program module within the group of program modules between an active status in which the program module is being executed by the data processing system and an inactive status in which the program module is not being executed by the data processing system;
   in response to detecting the change in the status of the program module by the monitoring modifying the message types data structure, wherein the modifying includes adding an allowable message type if a program module changed status from inactive to active and removing an allowable message type if the program module changed status from active to inactive; and
   selectively communicating a message with one or more program modules among said group of program modules based on whether an item of identifying information within said message meets a filtering criterion specified within said allowable message types data structure.

2. The method of claim 1, wherein said selectively communicating further comprises:
   prohibiting the message from being transmitted by a component of the data processing system on a message transmission backbone of the data processing system to a program module within the group of program modules based on whether an item of identifying information within said message meets a criterion of a message pre-filter.

3. The method of claim 1, wherein said item of identifying information comprises a message type field.

4. The method of claim 1, wherein the data processing system is a heterogeneous data processing system, and the method further comprises a processing node within the data processing system receiving the message via a data transmission backbone of the data processing system from a heterogeneous remote node in the data processing system.

5. The method of claim 1, wherein said monitoring step occurs in response to the installation within the data processing system of a new program module.

6. The method of claim 1, wherein said monitoring step occurs in response to activation within the data processing system of an existing program module within the group of program modules.

7. The method of claim 1, wherein:
   generating an allowable message types data structure includes dynamically generating the allowable message types data structure based on which program modules are executing on the data processing system.

8. The method of claim 1, wherein:
   the method further comprises detecting installed components in the data processing system;
   the allowable message types data structure defines multiple message groups; and
   the selectively communicating includes excluding all messages in one of the multiple message groups if the detecting indicates a corresponding component is not installed in the data processing system.

9. The method of claim 1, and further comprising:
   the allowable message types data structure defines multiple message groups; and
   the selectively communicating includes communicating some messages in one of the multiple message groups to a module within the group of program modules and prohibiting communication of other messages in said one of the multiple message groups.

10. A data processing system, comprising:
    a processor; and
    a data storage device storing program code executable by the processor, wherein the program code includes:
      instructions that when executed cause the data processing system to generate an allowable message types data structure, wherein each entry of said allowable message types data structure includes information for identifying at least an allowable message type for one or more program modules within a group of program modules within the data processing system;
      instructions that when executed cause the data processing system to repetitively monitor for a change in a status of a program module within the group of program modules between an active status in which the program module is being executed by the data processing system and an inactive status in which the program module is not being executed by the data processing system;
      instructions that when executed cause the data processing system, responsive to detecting the change in the status of the program module by the monitoring, to modify at least one entry within said allowable message types data structure, wherein the modifying includes adding an allowable message type if a program module changed status from inactive to active and removing an allowable message type if the program module changed status from active to inactive; and instructions that when executed cause the data processing system to selectively communicate a message to one or more program modules among said group of program modules based on whether an item of identifying information within said message meets a criterion specified within said allowable message types data structure.

11. The data processing system of claim 10, wherein:
the data processing system includes a message transmission backbone; and
the instructions that when executed cause the data processing system to selectively communicate a message include instructions that when executed cause the data processing system to prohibit a message from being transmitted by a component of the data processing system on the message transmission backbone to a program module within the group of program modules based on whether an item of identifying information within said message meets a criterion of a message pre-filter.

12. The data processing system of claim 10, wherein said item of identifying information further comprises a message type field.

13. The data processing system of claim 10, wherein the data processing system is a heterogeneous data processing system including a data transmission backbone, and the message is received at a processing node of the data processing system via the data transmission backbone from a heterogeneous remote node within the data processing system.

14. The data processing system of claim 10, wherein said instructions that when executed cause the data processing system to monitor cause the data processing system to monitor in response to the installation of a new program module within the data processing system.

15. The data processing system of claim 10, wherein said instructions that when executed cause the data processing system to monitor cause the data processing system to monitor in response to activation of an existing program module within the group of program modules.

16. A computer program product, comprising:
a computer-readable storage device;
program code stored within the computer-readable storage device and executable by a data processing system, said program code including:
  instructions on the computer-readable storage device that when executed cause the data processing system to generate an allowable message types data structure, wherein each entry of said allowable message types data structure includes information for identifying at least an allowable message type for one or more program modules within a group of program modules within the data processing system;
  instructions on the computer-readable storage device that when executed cause the data processing system to repetitively monitor for a change in a status of a program module within the group of program modules between an active status in which the program module is being executed by the data processing system and an inactive status in which the program module is not being executed by the data processing system;
  instructions on the computer-readable storage device that when executed cause the data processing system, in response to detecting the change in the status of the module within the group of loaded programs, to modify at least one entry within said allowable message types data structure, wherein the modifying includes adding an allowable message type if a program module changed status from inactive to active and removing an allowable message type if the program module changed status from active to inactive; and
  instructions on the computer-readable storage device that when executed cause the data processing system to selectively communicate a message to one or more program modules among said group of program modules based on whether an item of identifying information within said message meets a criterion specified within said allowable message types data structure.

17. The computer program product of claim 16, wherein:
the data processing system includes a message transmission backbone; and
the instructions that when executed cause the data processing system to selectively communicate a message include instructions on the computer-readable storage device that when executed cause the data processing system to prohibit a message from being transmitted by a component of the data processing system on the message transmission backbone of the data processing system to a program module within the group of program modules based on whether an item of identifying information within said message meets a criterion of a message pre-filter.

18. The computer program product of claim 16, wherein said item of identifying information further comprises a message type field.

19. The computer program product of claim 16, wherein said instructions that when executed cause the data processing system to monitor in response to the installation of a new program module within the data processing system.

20. The computer program product of claim 16, wherein said instructions that when executed cause the data processing system to monitor in response to the activation of an existing program module within the group of program modules.

21. A method for handling a message on a message transmission backbone within a mobile data processing system for controlling a plurality of features and functions of a vehicle, said method comprising:
  the mobile data processing system generating an allowable message types data structure, wherein each entry of said allowable message types data structure includes information for identifying an allowable message type describing a message that may be present on a message transmission backbone within the mobile data processing system for controlling a plurality of features and functions of the vehicle;
  the mobile data processing system repetitiously detecting a change in a status of a module within a group of loaded programs within the mobile data processing system, wherein said group of loaded programs includes multiple data processing software modules;
  in response to detecting the change in the status of the module within the group of loaded programs, the mobile data processing system modifying a corresponding entry within said allowable message types data structure; and
  the mobile data processing system communicating a message, which message was received from the message transmission backbone within the mobile data processing system for controlling the plurality of features and functions of the vehicle, to said group of loaded programs based on whether an item of identifying information within said message meets all criteria specified within said allowable message types data structure.

22. A mobile data processing system for controlling a plurality of features and functions of a vehicle, said data processing system comprising:
- a processor; and
- a data storage device storing program code executable by the processor, wherein the program code includes:
  - instructions that when executed cause the data processing system to generate an allowable message types data structure, wherein each entry of said allowable message types data structure includes information for identifying an allowable message type describing a message that may be present on a message transmission backbone within a mobile data processing system for controlling a plurality of features and functions of a vehicle;
  - instructions that when executed cause the data processing system to repetitiously detect a change in a status of a module within a group of loaded programs within the mobile data processing system, wherein said group of loaded programs includes multiple data processing software modules;
  - instructions that when executed cause the data processing system means, responsive to detecting the change in the status of the module within the group of loaded programs, to modify a corresponding entry within said allowable message types data structure;
  - instructions that when executed cause the data processing system to communicate a message, which message was received from the message transmission backbone within the mobile data processing system for controlling the plurality of features and functions of the vehicle, to said group of loaded programs based on whether an item of identifying information within said message meets all criteria specified within said allowable message types data structure.

23. A computer program product, comprising:
a computer-readable storage device; and
program code stored on the computer-readable storage device and executable by a mobile data processing system for controlling a plurality of features and functions of a vehicle, said program code including:
- instructions on the computer-readable storage device that when executed cause the data processing system to generate an allowable message types data structure, wherein each entry of said allowable message types data structure includes information for identifying an allowable message type describing a message that may be present on a message transmission backbone within a mobile data processing system for controlling a plurality of features and functions of a vehicle;
- instructions on the computer-readable storage device that when executed cause the data processing system to repetitiously detect a change in a status of a module within a group of loaded programs within the mobile data processing system, wherein said group of loaded programs includes multiple data processing software modules;
- instructions on the computer-readable storage device that when executed cause the data processing system, responsive to detecting the change in the status of the module within the group of loaded programs, to modify a corresponding entry within said allowable message types data structure; and
- instructions on the computer-readable storage device that when executed cause the data processing system to communicate a message, which message was received from the message transmission backbone within the mobile data processing system, for controlling the plurality of features and functions of the vehicle, to said group of loaded programs based on whether an item of identifying information within said message meets all criteria specified within said allowable message types data structure.

* * * * *